United States Patent [19]

Zhuk et al.

[11] Patent Number: 4,467,115

[45] Date of Patent: Aug. 21, 1984

[54] METHOD FOR PREPARING BRANCHED POLYETHYLENIMINE

[75] Inventors: David S. Zhuk; Vera A. Keppen, both of Moscow; Nikolai A. Sivov, Schelkovo; Gennady F. Tereschenko, Leningrad; Igor M. Golubkov, Leningrad; Valery E. Timofeev, Leningrad, all of U.S.S.R.

[73] Assignee: Institut Neftekhimicheskogo Sinteza Imeni A.V. Toncheva Akademii Nauk SSSR, Moscow, U.S.S.R.

[21] Appl. No.: 433,669

[22] Filed: Oct. 12, 1982

[51] Int. Cl.³ .............................................. C07C 85/00
[52] U.S. Cl. .................................... 564/512; 528/422; 528/423
[58] Field of Search ................. 564/512; 528/422, 423

[56] References Cited

U.S. PATENT DOCUMENTS

| | | | |
|---|---|---|---|
| 2,182,306 | 12/1939 | Ulrich | 260/2 |
| 3,200,106 | 8/1965 | Dickson et al. | 564/512 X |
| 3,201,472 | 8/1965 | Spivack | 564/512 |
| 3,280,218 | 10/1966 | Endsley | 260/874 |
| 3,527,757 | 9/1970 | Austin et al. | 564/512 X |
| 4,143,003 | 3/1979 | Haas et al. | 564/512 X |
| 4,216,307 | 8/1980 | Yuasa et al. | 564/512 X |
| 4,316,840 | 2/1982 | Ford et al. | 564/512 X |
| 4,316,841 | 2/1982 | Ford et al. | 564/512 X |

FOREIGN PATENT DOCUMENTS 1020811  2/1966  United Kingdom .

OTHER PUBLICATIONS

The Journal of Organic Chemistry, 30, Title page and pp. 2002 and 2003, 1965.
Journal of The Chemical Society, 1956, Title page and pp. 2449 and 2450.

*Primary Examiner*—Paul F. Shaver
*Attorney, Agent, or Firm*—Ladas & Parry

[57] ABSTRACT

The present invention relates to the chemistry of polymers and, more specifically, to a method for preparing of branched polyethylenimine.

The method of this invention resides in that a 2-aryl (alkyl)-2-oxazoline is subjected to an isomerizing polymerization with the formation of a poly-N-aroyl(acyl)ethylenimine which is then hydrolyzed and the resulting linear polyethylenimine is alkylated in the presence of β-chlorethylene or β-aminoethylsulphate at a molar ratio of the alkylation agent to the linear polyethylenimine equal to at least 0.5:1 respectively.

4 Claims, No Drawings

METHOD FOR PREPARING BRANCHED POLYETHYLENIMINE

FIELD OF THE INVENTION

The present invention relates to chemistry of polymers and, more particularly, to methods for preparing branched polyethylenimine.

Branched polyethylenimine finds an extensive application in different industries mainly as an auxiliary agent intensifying processes of manufacture and improving quality of the final products in pulp-and-paper, coal mining and metallurgical industries. The use of branched polyethylenimine results from the fact that it is an efficient cationic polymer-flocculant which is superior to conventional inorganic flocculants: consumption rate of 1 to 5 mg/l, corrosion-inactive, does not change pH of the medium and the like.

The use of branched polyethylenimine in the pulp-and-paper industry for dehydration of pulp and increasing dryness of paper web in the manufacture of paper and cardboard the product output from paper-making machines is increased by 3–15% simultaneously with reducing, by 5–8 times, contamination of industrial waste waters.

Branched polyethylenimine finds an extensive use as a flocculant in coal production, chemical recovery coke-industry, mining.

Complexing properties of polyethylenimine make it possible to use it as the basic component for the preparation of electrolytes for zinc- and cadmium-plating containing no cyanide derivatives and adapted for use in different industries—radioengineering, automobile industry.

Owing to its ability of improving adhesion characteristics of a number of materials, polyethylenimine is also useful in the manufacture of fiber boards; it increases their mechanical strength by 1.5–2 times; in the manufacture of rubber vulcanizates as a modifying agent and an antiager; in textile industry for the antishrinkage treatment of wool fabrics.

BACKGROUND OF THE INVENTION

The most widely employed method for the preparation of branched polyethylenimine is based on polymerization of ethylenimine produced from ethanolamine by the Wenker process. Polymerization of ethylenimine is effected in the presense of acids (such as hydrochloric acid) in solution or in bulk (cf. U.S. Pat. No. 2,182,306 /1936/, Cl. 260-239; British Pat. No. 466,270 /1935/, Cl. C3R). The resulting product is branched polyethylenimine with a molecular mass not exceeding 10,000.

A disadvantage of this prior art method is the use, as the starting compound, of ethylenimine which is a highly-toxic, carcinogenous and mutagenous agent necessitating carrying out the process in automated expensive systems without access of the personnel to the apparatus. Furthermore, the polymerization process is accompanied by evolution of considerable heat, wherefore it is hazardous; for the same reason, it is difficult to store ethylenimine liable to auto-polymerization. In the preparation of the starting ethylenimine there are formed large quantities of liquid wastes containing residual amounts of ethylenimine which should be dispersed with by combustion, thus adding-up to power consumption for the process on the whole. Moreover, the polymer yield obtained in this prior art method is about 60% as calculated for the starting ethylenimine.

The above-mentioned disadvantages are inherent in other known methods for the preparation of branched polyethylenimine, since in each known method the starting product is a toxic, carcinogenous and mutagenous ethylenimine.

Thus, known in the art is a method for preparing branched polyethylenimine by block polymerization of ethylenimine in the presence of sulphuric acid at the temperature of 100° C. or in an aqueous solution at the temperature of 50° C. (cf. J.Org.Chem., 30, 1994 /1965/). Branched polyethylenimine with the molecular mass of 1,600 can be prepared by polymerization of ethylenimine in the presence of 3 mol.% of acetic acid at the temperature of 50° C. in a solution of methanol (J.Chem.Soc., 1956, 2448). Branched polyethylenimine with a higher molecular mass (30,000 to 40,000) can be prepared by polymerization of ethylenimine initiated by means of bifunctional alkylation agents such as epichlorohydrin (British Pat. No. 1,020,811 /1966/, Cl. C3R; U.S. Pat. No. 3,280,213 /1966/, Cl. 260-874).

OBJECT OF THE INVENTION

It is an object of the present invention to provide such a method for the preparation of branched polyethylenimine which would make it possible to simplify the process for the preparation of the desired product and render it less expensive.

SUMMARY OF THE INVENTION

This object is accomplished by the preparation of branched polyethylenimine by the method according to the present invention comprising isomerizing polymerization of a 2-aryl(alkyl)-2-oxazoline in the presence of protonic acids or complexes thereof with the starting 2-aryl(alkyl)-2-oxazoline, followed by hydrolysis of the remaining poly-N-aroyl(acyl)ethylenimine to linear polyethylenimine which is then subjected to alkylation with β-chlorethylamine or β-aminoethylsulphate at a temperature within the range of from 50° to 200° C. at a molar ratio of this alkylation agent to linear polyethylenimine equal to at least 0.5:1 respectively to give branched polyethylenimine.

The present invention makes it possible to eliminate the use of a highly-toxic, carcinogenous and mutagenous ethylenimine, thus avoiding in the process the use of special expensive operations dictated by labour safety: placing the process equipment into special airtight chambers, remote control of the process, use of a sophisticated system for purification of by-products formed in the process. The method according to the present invention makes it possible to vary molecular mass of the desired product within a broad range of from 4,000 to 500,000 and more. As an intermediate product in the method according to the present invention a linear crystalline high-density polyethylenimine is obtained which can find a wide commercial application. The yield of the desired product is as high as 70–80%.

According to the present invention, it is advisable that the alkylation be effected in block at a temperature within the range of from 100° to 120° C.

An embodiment of the present invention resides in that alkylation is effected by means of β-aminoethylsulphate in water at a temperature of from 95° to 105° C. to increase molecular mass of branched polyethylenimine.

Other objects and advantages of the present invention will now become more fully apparent from the following detailed description of the method for the preparation of branched polyethylenimine and examples illustrating its embodiments.

DETAILED DESCRIPTION OF THE INVENTION

According to the present invention, as the starting compound use is made of a known 2-aryl(alkyl)-2-oxazoline which can be prepared by a known method, for example from ethanolamine and methyl(ethyl)benzoate.

This 2-aryl(alkyl)-2-oxazoline is subjected to isomerizing polymerization in the presence of a polymerization initiator—protonic acids or complexes thereof with the starting monomer-2-aryl(alkyl)-2-oxazoline. As a protonic acid use can be made, for example, of hydro-, chloric or sulphuric acid; as the above-mentioned complex suitable for carrying out such polymerization use can be made of an equimolar complex of hydrochloric acid with 2-aryl(alkyl)-2-oxazoline.

An optimal ratio between the starting monomer and the employed initiator can be varied within the range of 100-6,000:1. The polymerization is conducted at an elevated temperature of about 150° C. The polymerization time depends on the amount of the initiator employed. The isomerizing polymerization gives poly-N-aroyl(acyl)ethylenimine which is subjected to hydrolysis according to the present invention. It is preferable to carry out hydrolysis in the presence of hydrochloric acid, then by way of boiling the reaction mass in a solution of caustic soda for the time sufficient for a complete hydrolysis of poly-N-aroyl(acyl)ethylenimine to give linear polyethylenimine. The resulting linear polyethylenimine is a crystalline, high-density (d=1.126 g/cm$^3$) product ready for a commercial use and having molecular mass of up to 100,000.

According to the present invention, the resulting linear polyethylenimine is subjected to alkylation by means of an alkylation agent comprising $\beta$-chlorethylamine or $\beta$-aminoethylsulphate. These alkylation agents have been selected due to their ability, while alkylating linear polyethylenimine, of not changing its general formula ($CH_2CH_2NH_n$) and its chemical nature. It has been found that the use of the alkylation agent in an amount lesser than 0.5 mol per mol of linear polyethylenimine causes a reduced yield of the desired product, i.e. the alkylation is not complete. At a higher amount of the alkylation agent there can be obtained branched polyethylenimine with increasing molecular mass.

The alkylation temperature is varied within the range of from 50° to 200° C.

It is advisable to carry out alkylation in block at a temperature of from 100° to 120° C. which is the simplest mode of alkylation under conditions preventing decomposition of the starting linear polymer.

It is advisable to carry out alkylation in water, since alkylation agents are water-soluble and the reaction can be conducted under homogeneous conditions. In doing so, $\beta$-aminoethylsulphate is used. The alkylation temperature is within the range of from 95° to 105° C.

Another embodiment of the alkylation stage according to the present invention comprises alkylation in polar solvents such as ethanol, dimethylformamide, dimethylsulphoxide, hexamethylphosphotriamide. The alkylation temperature corresponds to the boiling temperature of the solvent employed.

As a result of alkylation branched polyethylenimine is obtained which can be used without recovery as corresponding solutions, depending on a particular application field. The molecular mass can be adjusted, as it has been mentioned hereinbefore, within a wide range in the stage of polymerization of the starting monomer by varying the ratio between the monomer and the initiator. This can result in a molecular mass of from 80,000 to 100,000. By changing the ratio between the polymer and the alkylation agent in the alkylation stage it is possible to increase the molecular mass of the desired product up to 500,000 and over.

There is obtained a quantitative yield of branched polyethylenimine based on linear polyethylenimine and the alkylation agent.

The yield of branched polyethylenimine is 70-80% and more. Elemental composition and structure of branched polyethylenimine prepared according to the present invention can be determined by methods of IR and NMR spectroscopy.

EXAMPLE 1

50 g of 2-phenyl-3-oxazoline are polymerized at the temperature of 150° C. for 40 minutes in the presence of an equimolar complex of perchloric acid with 2-phenyl-2-oxazoline taken in the ratio of the monomer to the initiator equal to 100:1. The resulting poly-N-benzoylethylenimine is hydrolyzed first with an aqueous solution of hydrochloric acid at reflux. The thus-prepared polymer is boiled in a solution of caustic soda. Linear polyethylenimine is dried over phosphorus pentoxide to give 12.8 g of an anhydrous polymer; the yield is 88%, intrinsic viscosity of the polymer $[\eta]^{20}=0.18$ dl/g (abs.alcohol) which corresponds to the molecular mass of 5,000.

The molecular mass is determined by the method of sedimentation and according to the data of the Kubn-Marc-Hauwink relationship. The structure of the resulting polymers is proven by elemental analysis, as well as IR and NMR spectroscopy.

EXAMPLE 2

A linear polymer is prepared under conditions similar to those described in the foregoing Example 1, except that the polymerization is carried out at the ratio between the monomer and the initiator (perchloric acid) of 500:1. There are thus obtained 13.2 g of a linear polymer. The yield is 92%, $[\eta]^{20}=0.32$ dl/g (absolute alcohol) which corresponds to the molecular mass of 20,000.

EXAMPLE 3

A linear polymer is prepared under conditions similar to those of Example 1, except that the polymerization is conducted at the ratio between the monomer and the initiator of 1,000:1 for 4 hours. 12.7 g of a linear polymer are thus obtained, the yield is 87%, $[\eta]^{20}=0.73$ dl/g (absolute alcohol) which corresponds to the molecular mass of 40,000.

EXAMPLE 4

A linear polymer is prepared under conditions similar to those of Example 1 hereinbefore, except that the polymerization is carried out at the ratio between the monomer and the initiator (sulphuric acid) equal to 6,000:1 and as the monomer use is made of 2-(p-chlorophenyl)-2-oxazoline. 12.6 g of an anhydrous polymer are obtained, the yield is 90%, $[\eta]^{20}=1.18$ dl/g (absolute alcohol) which corresponds to the molecular mass of 100,000; density is 1.126.

EXAMPLE 5

A linear polymer is prepared under conditions similar to those of Example 1, except that the polymerization is carried out for 80 hours in the presence of sulphuric acid and as the monomer use is made of 2-methyl-2-oxazoline. The resulting intermediate poly-N-acylethylenimine is hydrolyzed. The yield is 90%, $[\eta]^{20}=0.10$ dl/g (absolute alcohol) which corresponds to the molecular mass of 2,000.

EXAMPLE 6

3.1 g (0.073 mol) of a linear polymer prepared as in Example 2 are mixed with 6.0 g (0.052 mol) of β-chlorethylamine in 100 ml of absolute ethanol and heated at the temperature of 50° C. for 47 hours. On completion of the reaction ethanol is distilled-off and the residue is dissolved in distilled water. Branched polyethylenimine is recovered by caustic soda in excess, purified by absolute ethanol from inorganic contaminants and by water in the case of an incomplete alkylation to give 5.1 g of branched polyethylenimine, $[\eta]^{20}=0.81$ dl/g (absolute alcohol) which corresponds to the molecular mass of 28,000.

EXAMPLE 7

Branched polyethylenimine is prepared under conditions similar to those specified in Example 6, except that the alkylation is conducted in 100 ml of water at the temperature of 100° C. to give 5.2 g of a branched polymer, $[\eta]^{25}=0.31$ dl/g (0.1 N solution of NaCl in water) which corresponds to the molecular mass of 28,000.

EXAMPLE 8

Branched polyethylenimine is prepared under conditions similar to those specified in Example 6, except that the alkylation is carried out in 100 ml of water at the temperature of 100° C. using β-aminoethylsulphate as an alkylation agent in the amount of 1.0 mol per mol of linear polyethylenimine. This temperature is maintained for 40 hours. There are consumed 1.35 g of the linear polymer. 2.1 g of branched polyethylenimine are obtained, $[\eta]^{20}=0.88$ dl/g (absolute alcohol) which corresponds to the molecular mass of 31,000.

EXAMPLE 9

Branched polyethylenimine is prepared under conditions similar to those of Example 6, except that as the alkylation agent use is made of β-aminoethylsulphate in the amount of 1.0 mol per mol of a linear polymer employed in the amount of 1.8 g. The alkylation is effected in an aqueoalcoholic mixture for 50 hours at the temperature of 80° C. There are thus obtained 3.3 g of a branched polymer $[\eta]^{20}$ is 1.01 dl/g (absolute alcohol) which corresponds to the molecular mass of 36,000.

EXAMPLE 10

Branched polyethylenimine is obtained under conditions similar to those of Example 6, except that the alkylation agent is β-aminoethylsulphate in the amount of 1.5 mol per mol of the linear polymer. The alkylation is conducted in dimethylformamide at the temperature of 150° C. for 25 hours. From 2.65 g of the linear polymer there are obtained 6.6 g of branched polyethylenimine, $[\eta]^{25}=0.50$ dl/g (0.1 N solution of NaCl in water) which corresponds to the molecular mass of 50,000.

EXAMPLE 11

Branched polyethylenimine is prepared under conditions similar to those described in Example 6, except that as the alkylation agent use is made of β-aminoethylsulphate in the amount of 0.5 mol per mol of the linear polymer. The alkylation is carried out in water at the temperature of 100° C. for 40 hours. From 1.2 g of the linear polymer there are obtained 1.6 g of branched polyethylenimine, $[\eta]^{20}=0.73$ dl/g (absolute alcohol) which corresponds to the molecular mass of 25,000.

EXAMPLE 12

Branched polyethylenimine is prepared under conditions similar to those of Example 6, except that as the alkylation agent use is made of β-aminoethylsulphate in the amount of 0.5 mol per mol of the linear polymer. The alkylation is conducted in block at the temperature of 130° C. for 34 hours. From 3.9 g of the linear polymer there are prepared 6.1 g of branched polyethylenimine, $[\eta]^{25}=0.34$ dl/g (0.1 N solution of NaCl in water) which corresponds to the molecular mass of 31,000.

EXAMPLE 13

Branched polyethylenimine is produced under conditions similar to those described in Example 6 hereinbefore, except that as the alkylation agent use is made of β-aminoethylsulphate in the amount of 5.0 mol per mol of the linear polymer. The alkylation is conducted in block at the temperature of 200° C. for 15 hours. From 1.35 g of linear polyethylenimine there are obtained 7.8 g of branched polyethylenimine, $[\eta]^{25}=0.88$ dl/g (0.1 N solution of NaCl in water) which corresponds to the molecular mass of 100,000.

EXAMPLE 14

Branched polyethylenimine is prepared under conditions similar to those of Example 6, except that as the alkylation agent use is made of β-aminoethylsulphate in the amount of 10 mol per mol of the linear polymer. The alkylation is carried out in block at the temperature of 200° C. for 15 hours. From 4.3 g of the linear polymer there are produced 34.4 g of branched polyethylenimine, $[\eta]^{25}=1.34$ dl/g (0.1 N solution of NaCl in water) which corresponds to the molecular mass of 160,000.

EXAMPLE 15

Branched polyethylenimine is prepared under conditions similar to those of Example 6, however, as the linear polymer use is made of a compound prepared as in Example 3, the alkylation is conducted in 100 ml of water in the presence of β-aminoethylsulphate in the amount of 2.0 mol per mol of the linear polymer at the temperature of 100° C. for 40 hours. From 1.4 g of the linear polymer there are obtained 11.0 g of branched polyethylenimine, $[\eta]^{25}=0.89$ dl/g (0.1 N solution of NaCl in water) which corresponds to the molecular mass of 100,000.

EXAMPLE 16

Branched polyethylenimine is obtained under conditions similar to those specified in Example 6, except that as the linear polymer use is made of a compound prepared as in Example 3, alkylation is effected in block at the temperature of 130° C. for 68 hours in the presence of β-aminoethylsulphate in the amount of 20 mol per mol of the linear polymer. From 0.4 g of the linear polymer there are obtained 6.2 g of branched polyethylenimine, $[\eta]^{25}=3.49$ dl/g (0.1 N solution of NaCl in water) which corresponds to the molecular mass of 500,000.

EXAMPLE 17

Branched polyethylenimine is obtained under conditions similar to those of Example 6, with the only exception that as the solvent use is made of dimethylsulphoxide, as the alkylation agent β-aminoethylsulphate in the amount of 1.5 mol per mol of the linear polymer. The alkylation is effected at the temperature of 150° C. for 25 hours. There are thus obtained (from 2.7 g of linear polyethylenimine) 6.5 g of branched polyethylenimine, $[\eta]^{25}=0.50$ dl/g (0.1 N solution of NaCl in water) which corresponds to the molecular mass of 50,000.

EXAMPLE 18

Branched polyethylenimine is produced under conditions described in Example 6, except that as the solvent use is made of hexamethylphosphotriamide, as the alkylation agent-β-aminoethylsulphate in the amount of 1.5 mol per mol of the linear polymer. The alkylation is conducted for 25 hours at the temperature of 150° C. From 2.6 g of the linear polymer there are obtained 6.5 g of branched polyethylenimine, $[\eta]^{25}=0.52$ dl/g (0.1 N solution of NaCl in water) which corresponds to the molecular mass of 50,000.

What is claimed is:

1. A method for preparing branched polyethylenimine comprising:
   (1) isomerizing polymerization of a 2-aryl(alkyl)-2-oxazoline in the presence of protonic acids or complexes thereof with the starting 2-aryl(alkyl)-2-oxazoline with the formation of a poly-N-aroyl-(acyl)ethylenimine;
   (2) hydrolysis of the resulting poly-N-aroyl(acyl)ethylenimine with the formation of a linear polyethylenimine;
   (3) alkylation of the resulting linear polyethylenimine by an alkylation agent comprising β-chlorethylamine or β-aminoethylsulphate at a temperature within the range of from 50° to 200° C. at a molar ratio of the alkylation agent to the linear polyethylenimine of at least 0.5:1 respectively.

2. A method for preparing branched polyethylenimine as claimed in claim 1, wherein said alkylation is effected in block at the temperature of 100°–120° C.

3. A method for preparing branched polyethylenimine as claimed in claim 1, wherein said alkylation is effected by β-aminoethylsulphate in water at the temperature of 95°–105° C.

4. A method for preparing branched polyethylenimine as claimed in claim 1, wherein said alkylation is effected in polar solvents.

* * * * *